United States Patent
Oh

(10) Patent No.: US 6,224,822 B1
(45) Date of Patent: May 1, 2001

(54) SYNCHRONIZER RING AND MANUFACTURING METHOD THEREOF

(75) Inventor: Jung Seok Oh, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/513,318

(22) Filed: Feb. 25, 2000

(30) Foreign Application Priority Data

Jun. 12, 1999 (KR) .................................................. 98-055249

(51) Int. Cl.$^7$ ....................................................... B22F 7/04
(52) U.S. Cl. .................................................................. 419/5
(58) Field of Search ..................................................... 419/5

(56) References Cited

U.S. PATENT DOCUMENTS

| | | | |
|---|---|---|---|
| 3,802,849 | * | 4/1974 | Kimura et al. ...................... 29/182.2 |
| 4,267,912 | * | 5/1981 | Bauer et al. ........................ 192/53 F |
| 4,943,321 | * | 7/1990 | Akutsu ................................. 75/243 |
| 4,951,798 | * | 8/1990 | Knoess ............................ 192/107 M |
| 5,114,468 | * | 5/1992 | Akutsu et al. .......................... 75/234 |
| 5,337,872 | * | 8/1994 | Kawamura et al. ............ 192/107 M |
| 5,407,043 | * | 4/1995 | Yamada ............................ 192/107 M |
| 6,014,807 | * | 1/2000 | O ....................................... 29/893.37 |

* cited by examiner

*Primary Examiner*—Daniel Jenkins
(74) *Attorney, Agent, or Firm*—Christie, Parker & Hale, LLP

(57) ABSTRACT

A synchronizer ring of the transmission of an automobile comprising an inner ring made of the powder of sintered ferroalloy, and an outer ring made of the brass-sintered alloy, the inner ring and the outer ring are integrally united by the brazing. The synchronizer ring is manufactured by method comprising step for pressurizing the powder of the sintered ferroalloy with the pressure 6~7 ton/cm$^2$ and forming the body of the outer ring under the reducing atmosphere at the temperature of 1,140±20° C., step for forming the inner ring with the brass-sintered alloy and plating the outer ring with nickel, step for spreading the brazing powder on the surface of the inner ring; and step for brazing the inner ring and the outer ring and integrally uniting each other under the reducing atmosphere at the temperature of 900~920° C. for 20~40 minutes.

1 Claim, No Drawings

SYNCHRONIZER RING AND MANUFACTURING METHOD THEREOF

FIELD OF THE INVENTION

The present invention relates to a synchronizer ring for the transmission of an automobile, more particularly a synchronizer ring for an automobile of an automobile having double structure and method of manufacturing thereof.

BACKGROUND OF THE INVENTION

Typically, a synchronizer ring equipped on the transmission of an automobile is a single structure. The main material of the synchronizer ring is comprised of high tensile brass forged.

The detail composition of the material of the prior synchronizer ring of the transmission of the automobile is composed of Cu 59~65 weight %, Al 1.7~3.7 weight %, Mn 2.2~3.8 weight %, Si 0.5~1.3 weight %, Fe 0.6 weight %, Ni 0.2~0.6 weight %, and Zn being the rest.

The material comprising the above compositions is manufactured to the single structure of synchronizer ring by the continuous casting method through the processes such as melting, transporting, cutting, and forming or by the extrusion casting method through the process such as melting, billeting, cutting, thermal extruding, straightening, and forming.

The synchronizer ring of the transmission of an automobile slides on the synchronizer hub along the axial direction. Then the material of the prior synchronizer ring of the transmission is easily worn out by the friction force on the synchronizer hub.

SUMMARY OF THE INVENTION

The object of the present invention is to provide a synchronizer ring of the transmission of an automobile, of which durability is highly increased.

The other object of the present invention is to provide method of manufacturing the synchronizer ring of the transmission of an automobile, which comprised of an inner ring and an outer ring that are made of different materials respectively.

The present invention to achieve the above object comprises an outer ring made of the powder of sintered ferroalloy, and an inner ring made of the brass-sintered alloy. And the inner ring and the outer ring are integrally united by the brazing.

The sintered ferroalloy is comprised of iron as base material and contains C 0.3~0.6 weight %, Cu 1.0~3.0 weight %, Ni 3.0~5.0 weight %, and Mo 0.1~1.0 weight %.

The brass-sintered alloy is comprised of copper as base material and contains Zn 20~35 weight %, Sn 1~5 weight %, Al 1~5 weight %, Mn 1~5 weight %, graphite 1~5 weight %, and FeB 1~5 weight %.

The synchronizer ring in accordance with the present invention is manufactured by method comprising step for pressurizing the powder of the sintered ferroalloy with the pressure 6~7 ton/cm$^2$ and forming the body of the outer ring under the reducing atmosphere at the temperature of 1,140±20° C., step for forming the inner ring with the brass-sintered alloy and plating the outer ring with nickel, step for spreading the brazing powder on the surface of the inner ring; and step for brazing the inner ring and the outer ring and integrally uniting each other under the reducing atmosphere at the temperature of 900~920° C. for 20~40 minutes.

DETAILED DESCRIPTION OF THE PRESENT INVENTION

The synchronizer ring of the transmission of an automobile is composed of an inner ring made of the powder of sintered ferroalloy and an outer ring made of the brass-sintered alloy. The outer ring and the outer ring are integrally united by the brazing.

Method of manufacturing the synchronizer ring in accordance with the present invention is comprised of steps: pressurizing the powder of the sintered ferroalloy with the pressure 6~7 ton/cm$^2$ and forming the body of the outer ring under the reducing atmosphere at the temperature of 1,140±20° C., forming the inner ring with the brass-sintered alloy and plating the outer ring with nickel, spreading the brazing powder on the surface of the inner ring, and brazing the inner ring and the outer ring and integrally uniting each other under the reducing atmosphere at the temperature of 900~920° C. for 20~40 minutes.

As described above, the synchronizer ring in accordance with the present invention is a double structure that is composed of an inner ring made of brass-sintered alloy and the outer ring made of the sintered ferroalloy.

The outer ring of the synchronizer ring is composed of iron as base material and contains C 0.3~0.6 weight %, Cu 1.0~3.0 weight %, Ni 3.0~5.0 weight %, and Mo 0.1~1.0 weight %.

The powder of the alloy including the above compositions is prepared and mixed. The powder is pressurized with the pressure of 6~7 ton/cm$^2$ to have density of 6.8~6.9 g/cm$^2$, and then sintered under the reducing atmosphere at the temperature 1.140±20° C. for 30~60 minutes.

On sintering the powder of the alloy, if the temperature is too low, the sintering working is not fully done. If the sintering temperature is above 1160° C., the grain of the alloy become too larger and the hardness is reduced.

On the other hand, the inner ring in accordance with the present invention is made of the brass-sintered alloy. The inner ring is composed of copper as base material and contains Zn 20~35 weight %, Sn 1~5 weight %, Al 1~5 weight %, Mn 1~5 weight %, graphite 1~5 weight %, and FeB 1~5 weight %.

Zn increases the strength of the alloy and Sn increases the strength and the wear resistance of the alloy. If Sn is contained less than 1%, there is no effect in addition. If Sn is contained above 5%, it is not economical.

Al increases the strength of the alloy and refines the grain of the alloy. If the amount of the Al is less than 1 weight %, there is no effect in addition. If the amount is excess, the alloy become brittle.

Mn removes the fault of the material. If the amount of the Mn is less than 1 weight %, there is no effect in addition. If the amount is above 5 weight %, the wear resistance is decreased.

Graphite increases the friction force and the wear resistance. If the amount of the graphite is less than 1 weight %, there is no effect in addition. If the amount is excess above 5 weight %, the alloy become brittle.

Finally, Fe-B increases the friction force and removes the fault of the material. If the amount of the Fe-B is less than 1 weight %, there is no effect in addition. If the amount is excess 5 weight %, wear resistance is decreased.

The powder of the material including the above compositions is mixed and compressed with the pressure of 2~3ton/cm$^2$ to have forming density of 6.8~7.0 g/cm$^3$.

Nickel is plated on the inner ring with thickness of 3~5 μm. Then, the powdered copper for brazing is scattered on the surface of the inner ring, which is inserted in the outer ring made of the sintered ferroalloy. And the outer ring is sintered and welded to the inner ring by brazing method under the reducing environment at temperature of 900~920° C. for 20~40 minutes. At this time, the inner ring is not sintered and jointed to the outer ring below 900° C.

The synchronizer ring in accordance with the present invention is described with the embodiment examples and comparison examples.

EMBODIMENT EXAMPLES 1~6 AND COMPARISON EXAMPLES 1~3

The example embodiment 1~6 and comparison example 1 are made of the powder of the compositions listed in table 1, which are mixed and formed through the forming and sintering process to the double structure of synchronizer ring.

And the comparison example 2~3 are the synchronizer rings used in the present time, which has a single structure and is made of a brass-sintered alloy alone.

TABLE 1

| | Weight % | | | | | | | | |
|---|---|---|---|---|---|---|---|---|---|
| | Embodiment example | | | | | | Comparison example | | |
| Class | 1 | 2 | 3 | 4 | 5 | 6 | 1 | 2 | 3 |
| Zn | 26 | 26 | 26 | 26 | 23 | 28 | 26 | 33 | 31 |
| Sn | 2 | 2 | 2 | 2 | 2 | 2 | 2 | — | — |
| Graphite | 04 | 40 | 2 | 2 | 4 | 2 | 4 | — | — |
| Al | 3 | 3 | 3 | 3 | 2 | 2 | 3 | 3 | 4 |
| Mn | 2 | 1 | 2 | 1 | 2 | — | — | 3 | — |
| Fe—B | 3 | 1 | 3 | 1 | — | 3 | — | — | — |
| Si | — | — | — | — | — | — | — | 1 | 1 |
| Ni | — | — | — | — | — | — | — | 0.3 | 3.3 |
| Fe | — | — | — | — | — | — | — | — | 0.9 |
| Cu | rest | rest | rest | rest | rest | rest | rest | rest | Rest |

The abrasion test is carried out to the sintered ring made of the composition listed in the table 1, and the result is listed in table 2.

The conditions for the abrasion test are as follows:

1. type: pin-on-disc.
2. load: 20 lb
3. number of revolution: 1.000 rpm
4. cycle: 100,000 cycles
5. lubricant: W75
6. temperature: 80° C.

TABLE 2

| Classification | Coefficient of friction | Amount of abrasion |
|---|---|---|
| Embodiment Examples | | |
| 1 | 0.11~0.13 | 3.8 |
| 2 | 0.09~0.11 | 4.5 |
| 3 | 0.10~0.12 | 4.0 |
| 4 | 0.10~0.12 | 4.8 |
| 5 | 0.09~0.11 | 4.8 |
| 6 | 0.10~0.12 | 4.2 |
| Comparison Example | | |
| 1 | 0.07~0.09 | 6.0 |
| 2 | 0.07~0.09 | 5.2 |
| 3 | 0.08~0.10 | 5.0 |

As shown the result listed in table 2, the synchronizer ring in accordance present invention is superior to that of the comparison examples 2 and 3 in the friction force and the wear resistance.

What is claimed is:

1. A Method of manufacturing a synchronizer ring for a transmission of an automobile comprising following steps:

forming an outer ring body by pressurizing a powder of sintered ferroalloy within a pressure range of 6~7 ton/cm$^2$ and within a reducing atmosphere at the temperature of 1.140±20° C.;

plating the outer ring with nickel;

forming an inner ring body by pressurizing a powder of brass-sintered alloy within a pressure range of 2~3 ton/cm$^2$; and spreading a brazing powder on the surface of the inner ring and the outer ring and integrally uniting the rings under a reducing atmosphere at the temperature of 900~920° C. for 20~40 minutes.

* * * * *